United States Patent [19]
Taylor, Jr.

[11] 3,797,017
[45] Mar. 12, 1974

[54] DIGITAL MTI RADAR SYSTEM
[75] Inventor: John W. Taylor, Jr., Baltimore, Md.
[73] Assignee: Westinghouse Electric Corporation, Pittsburgh, Pa.
[22] Filed: Oct. 5, 1972
[21] Appl. No.: 295,338

[52] U.S. Cl............... 343/7.7, 343/5 DP, 343/16 M
[51] Int. Cl............................................... G01s 9/42
[58] Field of Search................ 343/5 DP, 7.7, 16 M

[56] References Cited
UNITED STATES PATENTS
3,634,859  1/1972  Wolf..................................... 343/7.7
3,281,834  10/1966  Caspers et al..................... 343/5 DP
3,212,089  10/1965  Longacre et al................. 343/16 M
3,568,185  3/1971  Page............................. 343/16 M X Primary Examiner—Malcolm F. Hubler
Attorney, Agent, or Firm—C. L. O'Rourke

[57] ABSTRACT

A radar system is disclosed utilizing digital techniques for implementing a moving target indicator (MTI) or pulse doppler type of radar. Significantly, the radar system of this invention has an inherent capability for far greater dynamic range than analog radar systems of the prior art, thereby enabling the detection of moving targets in a greater variety of operating environments. In a digital radar system, the achieved dynamic range is dependent upon the number of bits that the apparatus of the system is able to store and handle. In prior art digital radar systems, increased dynamic range was achieved by utilizing simple storage devices or handling devices capable of operating upon a greater number of bits. The obvious disadvantage of this approach, is the increasing cost of such equipment. In contrast to the prior art systems, this radar system incorporates apparatus for converting digital data into a logarithmic format, which converted data may then be handled and stored by apparatus of less complexity and cost.

15 Claims, 5 Drawing Figures

DIGITAL MTI RADAR SYSTEM

BACKGROUND OF THE INVENTION

1. Field of the Invention

This invention relates to radar systems and in particular to those radar systems incorporating digital techniques for suppressing echo signals received from relatively slow-moving and/or stationary objects.

2. Description of the Prior Art

This invention relates to radar systems capable of both receiving with minimum distortion echoes of greatly varying strength and of discriminating between echoes received from fixed (or relatively slow-moving) and faster-moving targets. The ability to discriminate involves the vector summation of a number of received echoes from the same target; this detection process is known as "pulse doppler" or "moving target indicator" (MTI). The capabilities of suppressing return echoes from stationary or slow-moving targets (clutter) is dependent upon not only the stability of the radar system and the distortion introduced in processing the echo, but also the nature of the clutter itself.

Basically, an MTI-type radar system transmits a series of pulses of carrier frequency toward a target to be detected. The pulses of radar signals are reflected by the targets and are received by the radar system, which is capable of synchronously detecting the echo signals. A moving target produces an echo of consistent amplitude (A) but varying in phase ($\phi$). A synchronous detector provides either an in-phase output signal ($I = A\cos\phi$) or a quadrature signal ($Q = A\sin\phi$), and converts the echo signals to a sinusoidally varying output. If the target is moving, the amplitude of the detected echo signal will vary, because the phase of the echo is varying; whereas if the target is stationary or only slowly moving, the phase of successive echoes derived from the stationary target will be substantially the same. Thus, an MTI radar system is able to discriminate against echo signals from relatively stationary objects due to the fact that the amplitudes of successive detected echo signals therefrom are relatively constant.

Prior art moving target indicators have employed quartz delay lines and analog subtracters to suppress stationary echo signals. The simplest form of subtracting circuits or cancellers incorporates a single delay line and compares two pulses; however, the performance of such a canceller is poor when the radar antenna is scanning. The velocity of various portions of the antenna aperture is sufficient to create a significant apparent velocity from perfectly stationary clutter, and these low-velocity echoes are not adequately suppressed by a two-pulse canceller. A typical solution to this problem is the cascading of a number of delay line subtracters, forming three, four or more pulse cancellers. As the number of pulses which are stored and are variously subtracted from each other increases, the degree of discrimination likewise increases. Unfortunately, the dynamic range of such delay components is limited by spurious internal reflections. Such cancellers do not accept echoes more than 35–40dB above the minimum detectable signal level.

When echo signals are received from relatively close clutter, the amplitude of the received signal may be quite large and as a result, the radar system may be incapable of rejecting signals of such a large amplitude. In such radar systems, one approach has been to limit the amplitude of these echoes prior to being applied to the canceller. However, limiting rejects a significant portion of the echo energy of an aircraft moving over clutter and also seriously degrades the MTI Improvement Factor when the antenna is scanning, as described in the articles, *Radar Handbook*, published 1970, section 17.7, by W. Shrader, and "Improvement Factor of Non Linear MTI in Point Clutter," *IEEE Transactions on Aerospace and Electronics Systems*, Vol. AES-4, July 1968, p. 640–644, by G. Grasso.

Thus, it would be highly desirable to avoid the use of limiting and to increase the dynamic range of an MTI system with the subsequent abilities to sense when the input signal exceeds its cancellation capability and to reduce its output sensitivity accordingly. Thus, an MTI system having a dynamic range substantially greater than the Improvement Factor of the radar provides a significant performance advantage, although there is no need for substatially improving the accuracy of processing the echoes.

The dynamic range restrictions imposed by analog delay lines can be avoided by the substitution of digital techniques. Following each transmission, the echoes are sampled at intervals which do not exceed the range resolution of the radar and are converted into digital numbers. The subsequent digital memory devices and the arithmetic operations which perform the MTI filtering process are mathematically perfect. The only restriction on dynamic range is imposed by the analog-to-digital converter, directly related to the number ($n$) of bits of data provided. Generally, the RMS noise level is adjusted to be approximately equal to the smallest increment that the analog-to-digital converter can detect (least significant bit), and the maximum echo which can be handled without distortion is $6(n-1)$ decibels above noise level. Digital MTI's utilizing up to 12-bit analog-to-digital converters are in current use, providing 66dB dynamic range.

A radar system having improved dynamic range would be capable of not only detecting the presence of a target of interest, but also of determining its angular position. Typically, the amplitudes of echoes received either simultaneously or sequentially or two or more antenna beams may be compared to determine the angular position of the target from a reference line. Such systems will require:

1. a digital MTI of wide dynamic range and having perfectly-matched velocity responses in multiple channels;
2. cancellers for the in-phase (I) and quadrature (Q) channels capable of making angular measurements independent of the phase of the echo signal;
3. a sensitivity-time-control (STC) for eliminating the effect of range on echo strength, allowing the available dynamic range to accommodate targets of different radar cross-section and uncertainty in propagation attenuation; and
4. circuits for combining digitally the I and Q channels and LOG conversion circuitry to maintain system accuracy.

The weakest link in such radar systems in the STC, which attempts to maintain the amplitude of the echo signal from both clutter and of the desired targets within the limited dynamic range of the system. The capability of an STC is limited by the uncertainty of how strong a given echo signal will be. For example, the amplitude of a signal is dependent upon the cross-section of the target seen by the radar system. Aircraft typically have median radar cross-sections between 1 and 100 square meters from nose-on aspect, but broadside cross-sections sometimes exceed $10^5$ square meters. The cross-section of clutter may be even significantly greater. As a target moves, the size of the cross-section in aspect may significantly change, even from a single aircraft nose-on. Under adverse weather conditions, radar systems operating at frequencies in excess of 3GHz will be subjected to increasingly severe attenuation of the echo signal. Further, ducting conditions may develop which produce abnormally strong echoes from targets at long range and low angles, but abnormally weak echoes from targets disposed at higher angles. Further signals reflected from the ground or sea can create lobing in elevation. All of these factors degrade the ability of the STC to predict echo strength.

Some radar systems expect to utilize echo signals from targets far off the nose of the beam. Such systems use a radar antenna capable of achieving a cosecant-squared elevation coverage and require full receiver sensitivity to make use of the high angle coverage. An STC can only operate at short range, maintaining the minimum target of interest at a modest signal-to-noise ratio when it is at the highest elevation angle in the specified coverage. Targets close to the nose of the beam typically provide echoes in the order of 20dB's stronger.

In addition to the uncertainty as to how strong the echo signal of the smallest target of interest will be, there are typically some constraints in the operation of a radar system which add to the required dynamic range of the system. For example, to prevent the noise or spurious signals generated in the MTI unit from degrading detectability by more than 1dB, the system noise must be 6dB stronger. A 0.5dB degradation requires the system noise to be 9dB above the lower limit of the dynamic range. At shorter ranges, the STC can reduce the system noise level to the point that only noise generated in the MTI is significant. The required dynamic range is also dependent upon the acceptable signal-to-noise ratio which may be, in turn, determined by the desired accuracy of angular measurement. Further, it is difficult to perfectly control sensitivity and some allowance must be made for inaccuracy. When it is desired to measure the angle of a target, the gain of each channel of a radar system must be accurately matched, necessitating step changes in sensitivity rather than continuous gain control. The size of these steps does represent an inaccuracy in STC compensation. In summary, the various factors enumerated above may typically require the following dynamic ranges:

| | |
|---|---|
| 1. uncertainity of echo cross-section (i.e., variation in size and distance of target) | 20dB |
| 2. fluctuation of echo cross-section (i.e., target orientation with respect to the radar system) | 8dB |
| 3. uncertainty of propagation loss from clutter such as rain | 18dB |
| 4. uncertainty of target position in beam | 0dB |
| 5. level of system noise (short-range/long-range) | 6dB |
| 6. desired signal-to-noise ratio at nose of beam | 12dB |
| 7. STC inaccuracy | 3dB |
| TOTAL | 61–67dB |

The above evaluation of required dB may be reduced if manual gain control is included. It is apparent that dynamic range of such a radar system is very severe unless manual control sensitivity is permitted. However, manual control is crude at best and is difficult to implement when the user of the information is not located at the radar. Further, the use of the radar system may be limited to the detection of one aircraft at a time.

The dynamic range requirement as discussed above is in marked contrast to requirement for suppressing rain echoes. Typically, an MTI Improvement Factor of 20dB is the most that can be expected if the clutter is created by turbulent rain conditions. The degree of improvement realized in such an environment is rarely degraded by the size of the increments in which the input signal is digitally quantized. If the echo signal is measured to an accuracy of four or more bits, the degree of improvement realized is not degraded by such digital quantizing. However, the dynamic range may still require 11–12 bits because of the uncertainty as to how strong the echo signals from both the rain and aircraft may be. Further, the accuracy of the angular interpolation is rarely impaired if the echoes are defined to only a four-bit accuracy, since the antenna pattern errors are of this order of magnitude.

SUMMARY OF THE INVENTION

It is therefore an object of this invention to increase significantly the dynamic range, without unduly increasing the storage or handling capabilities of a radar system.

It is a further object of this invention to decrease the storage capability of a radar system and in particular its digital filter, and permitting subsequent processing of the stored data by apparatus capable of operating upon digital words of a reduced number of digits.

In accordance with the teachings of this invention, an analog echo signal is converted to a digital number, whose logarithm is calculated in terms of its characteristic and mantissa. Significantly, the location of the first or most significant 1 in the binary number defines the "characteristic" of the logarithm, and the remainder of the number is an approximation of the "mantissa" of the logarithm. The number of bits required to represent accurately the logarithm of the digital number is less than the number of bits required to represent the natural number. Thus, it is possible to discard mantissa bits in excess of a predetermined number, since these excess bits contribute insignificantly to the overall accuracy of the system. As a result, the storage apparatus incorporated into a radar filter circuit may have a reduced capability without significantly sacrificing the accuracy of the system.

In an illustrative embodiment of this invention, the detected analog signal may be converted to a corresponding digital signal which, in turn, is converted to its logarithm. Since the most significant 1 in the binary word defines the characteristic of the logarithm, it is possible that the characteristic may be readily identified by determining the most significant 1 of the binary word; thereafter, the mantissa may be determined with the minimum number of bits required for data precision. This process may be accomplished rapidly with a minimum of hardware by performing a LIN-LOG conversion.

The digital logarithmic numbers are then stored in memory apparatus of reduced complexity and are read out and the anti-logarithm thereof obtained. The readout word is of a limited number of digits without sacrificing significantly the useful accuracy of the system. As a result, the storage space required and, further, the apparatus for additionally processing the signal does not require a high bit handling capability. For example, in an illustrative radar system, a stored detected echo signal may be subtracted as by a digital canceller (filter) from a subsequent detected echo signal to cancel signals resulting from clutter and to provide a signal indicative of a relatively fast-moving target.

The logarithmic techniques of this invention may be applied to a monopulse radar system in which echo signals from a pair of antenna beams are processed along dual channels of the system. Illustratively, in the digital canceller, each echo signal may be homodyned with a reference frequency to provide in-phase and quadrature signals (I and Q, respectively). After subtraction has been performed to substantially cancel clutter signals, the I and Q signals are converted to logarithmic form and recombined; the combined signals for each of the two channels are subtracted from each other to provide a signal indicative of the ratio of the beam strength of the two signals incident upon the radar antenna. This ratio is, in turn, indicative of the angle of the target from antenna boresight.

DESCRIPTION OF THE DRAWINGS

These and other objects and advantages of the present invention will become more apparent by referring to the following detailed description and accompanying drawings, in which.

DESCRIPTION OF THE PREFERRED EMBODIMENTS

Figure 1:
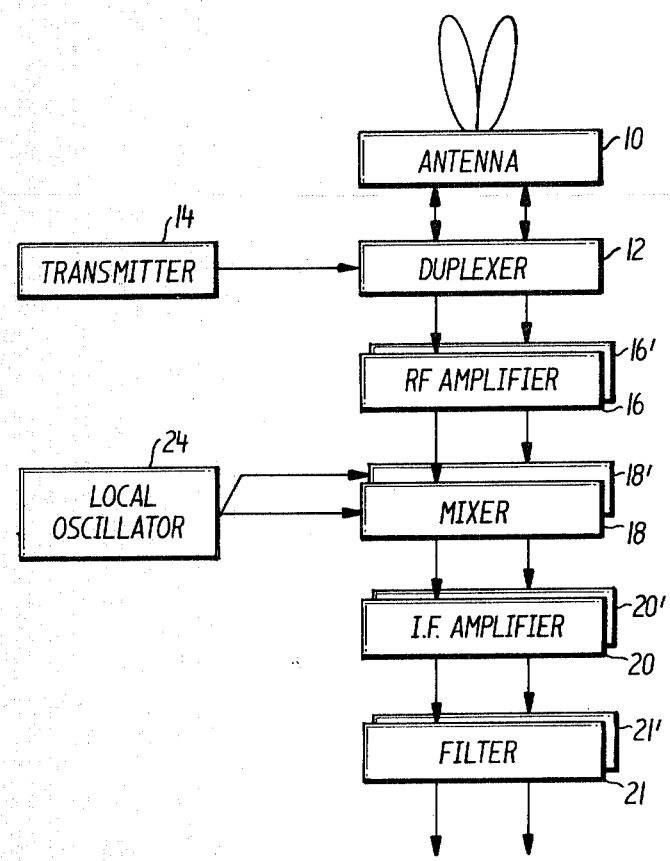
FIG. 1 is a schematic diagram of a radar system incorporating the teachings of this invention.

With regard to the drawings and in particular to FIG. 1, there is shown one illustrative embodiment of a radar system incorporating the teachings of this invention. In particular, there is shown a monopulse radar system for radiating a pair of adjacent beams from an antenna 10. As in a conventional system, the transmitter 14 applies a series of signal bursts through a duplexer 12 to the antenna 10. The received target echoes are switched through the duplexer 12 to be applied to an azimuth beam splitting receiver, including first and second channels for respectively processing the target echo signals. The azimuth beam splitting receiver will extract azimuth information on every received target signal. With this information and the pointing angle of the antenna, the azimuth position may be determined. The output of the receiver, as will be explained, may be applied to a suitable display device such as a cathode ray tube and includes signals indicative of intensification video (detected target) and vernier azimuth deflection video (beam interpolation angle).

The shape of the antenna beam is such that the received logarithmic power ratio on a target in the two azimuth beams is directly proportional to the angle between the target and the beam cross-over angle (or boresight) of the radar antenna 10. As will be evident from a further discussion of this invention, the amplitude of both of the echo signals resulting from the radiated azimuth beams will be preserved throughout the processing so that the desired ratio signal may be provided. More particularly, using precision logarithmic amplifiers and a linear subtracter, a signal will be produced directly proportional to the interpolation angle.

The first and second echo signals gated by the duplexer 12 are applied to first and second RF amplifiers 16 and 16', corresponding respectively to the channels for processing the first and second echo signals. In turn, the amplified signals are applied to a pair of mixers 18 and 18' for beating with a reference signal derived from a local oscillator 24 to thereby convert the radio frequency (RF) echo signals to intermediate frequency signals (IF). The IF signals are applied to a pair of IF amplifiers 20 and 20' and the amplified signals are in turn applied to a pair of filters 21 and 21', which minimize the noise obscuring the individual echo pulses. Significantly, this invention resides in a subsequent filter circuit 22 (and 22') whereby successive echo signals may be processed to cancel signals derived from slowly-moving or stationary objects while providing signals indicative of targets with a relatively high velocity with respect to the radar system. Further, the filter circuit to be described permits the echo signals to be processed in a manner to retain an indication of the amplitude, so that a ratio of the power (or amplitude) of the signals may be obtained as an indication of the angle between the target and the beam cross-over angle (or boresight) of the antenna 10.

Clutter may take the form of echo signals received from rain, chaff, the sea or ground, and structures such as towers, gas tanks or buildings. To suppress such clutter, the MTI system is sometimes made responsive to the relative velocity between the echo from one range cell and that of a neighboring range cell. It may be understood that rain or chaff, all parts of which are moving with the wind, will have a small velocity difference between one part of the cloud and another. In contrast, a target such as an aircraft will not be attenuated, because its velocity is distinctly different from that of the neighboring rain or ground clutter; the phase of the echo of a moving target, relative to the echo from clutter in the neighboring range cell, will vary from one transmission to the next. Thus, by storing a predetermined number of echo signals and by subtracting successive echo signals, the unwanted signals derived from clutter may be substantially canceled, whereas echo signals received from relatively high-velocity objects such as aircraft will provide a distinctive signal indicative of such targets.

Figure 2:
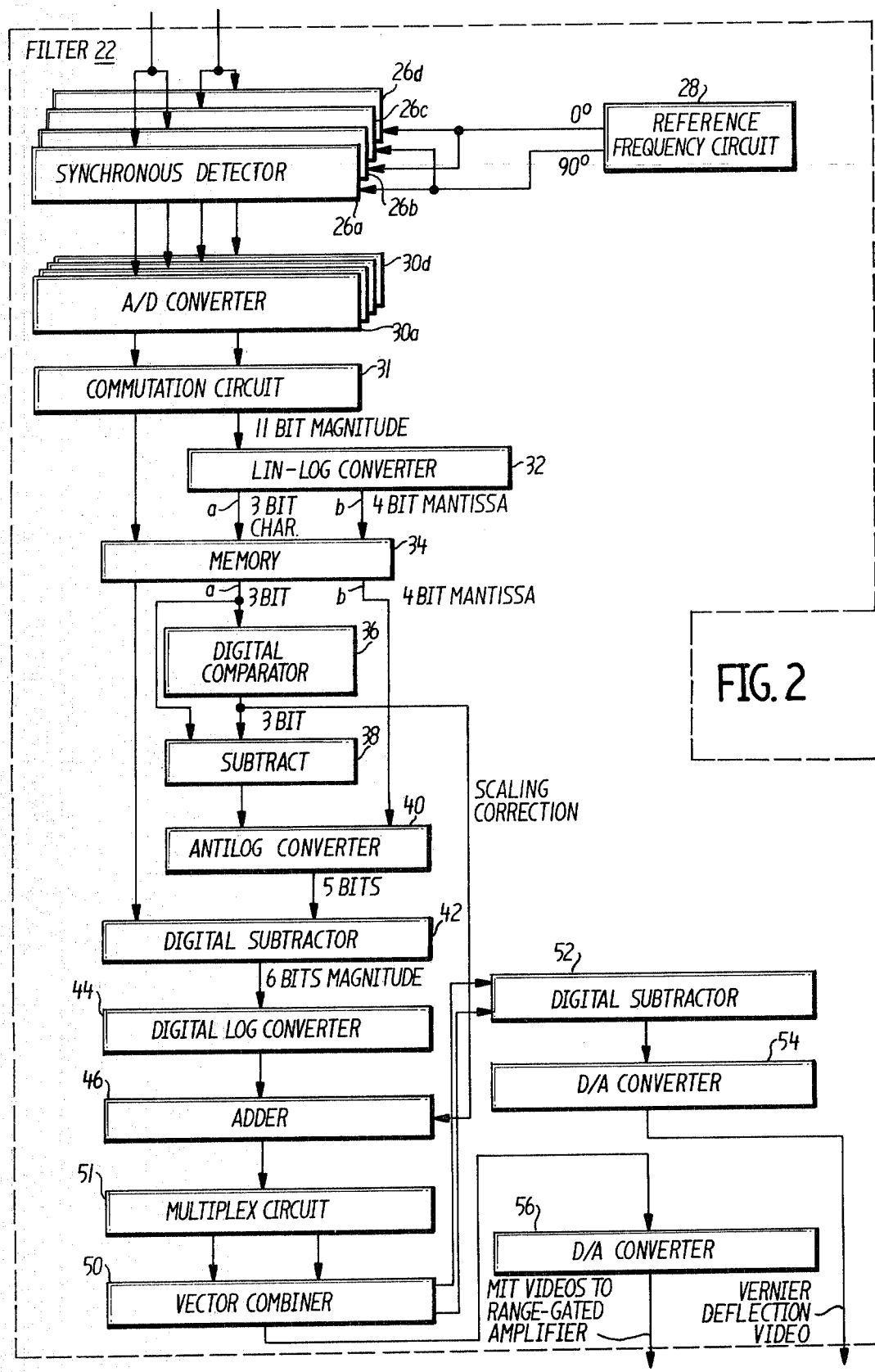
FIG. 2 is a schematic diagram of a filtering circuit in accordance with teachings of this invention to be incorporated into the radar system of FIG. 1.

The subsequent filter circuits 22 and 22' may be more fully characterized as MTI filters and are adapted as shown in FIG. 2 for use in a monopulse type of radar system. The desired characteristics of a monopulse MTI filter are adequate dynamic range to accommodate both target clutter and complete vector processing to provide an accurate indication of the angle between the target and the antenna boresight. As shown in FIG. 2, the MTI filter circuit 22 processes both the vector components of the echo signal, which are in-phase (I) and quadrature (Q) with a local reference signal as generated by a reference frequency circuit 28. In an illustrative embodiment of this circuit, the reference signal has a frequency of 30MHz, which is the intermediate frequency of the radar receiver. The phase reference in each of the two channels shown in FIG. 2, for any particular target echo signal, is either noise or clutter from the adjacent range cell. It is understood that the echo signals applied to the MTI filter 22 are signals sampled at a particular predetermined time after signal transmission corresponding to a target at a particular range, i.e., range cell.

In operation, the two echo signals are applied to a first pair of synchronous detectors 26a and 26b, and a second pair of synchronous detectors 26c and 26d, respectively. Throughout the following discussion, the suffixes a, b, c and d will indicate, respectively, the I and Q signals corresponding to the left (or first) echo signal, and the I and Q signals corresponding to the right (or second) echo signal, respectively. Both I and Q MTI cancellers are required for each channel of the receiver, so that the monopulse output is a function only of angular deviation of the target from the beam cross-over or antenna boresight and is independent of the phase of the target or the phase match of the two receivers.

The detected signals are applied respectively from the synchronous detectors 26a, 26b, 26c and 26d to analog-to-digital converters 30a, 30b, 30c and 30d, respectively. Those analog-to-digital converters are capable of receiving and converting an analog input signal into a 12-bit digital number indicative of the polarity (sign), and magnitude (or amplitude) of the input signal. As indicated in FIG. 2, one bit of the 12-bit storage is provided to indicate sign and eleven bits are designated for magnitude. In the illustrative embodiment shown in FIG. 2, the four 12-bit signals derived from the analog-to-digital converters 26a, b, c and d are applied to a commutation circuit 31 for applying in sequence (serially) the four twelve-bit digital signals to a single processing channel shown in FIG. 2, to be described. Alternatively, these digital operations could be performed by four parallel channels. If the processing were to be performed in parallel, as opposed to the sequential operation illustrated in FIG. 2, four duplicate circuits would be shown for each circuit shown in FIG. 2. In some instances, parallel operation may be necessary where speed of operation is beyond the capability of a single processor. In determining the degree of quantization required, it is noted that quantizing at relatively small signal amplitudes is limited both as to clutter and to target signals. Generally, it is desired to provide a storage and handling capability in terms of the number of bits such that the RMS noise inherent in the receiver exceeds the least significant bit.

Figure 5:
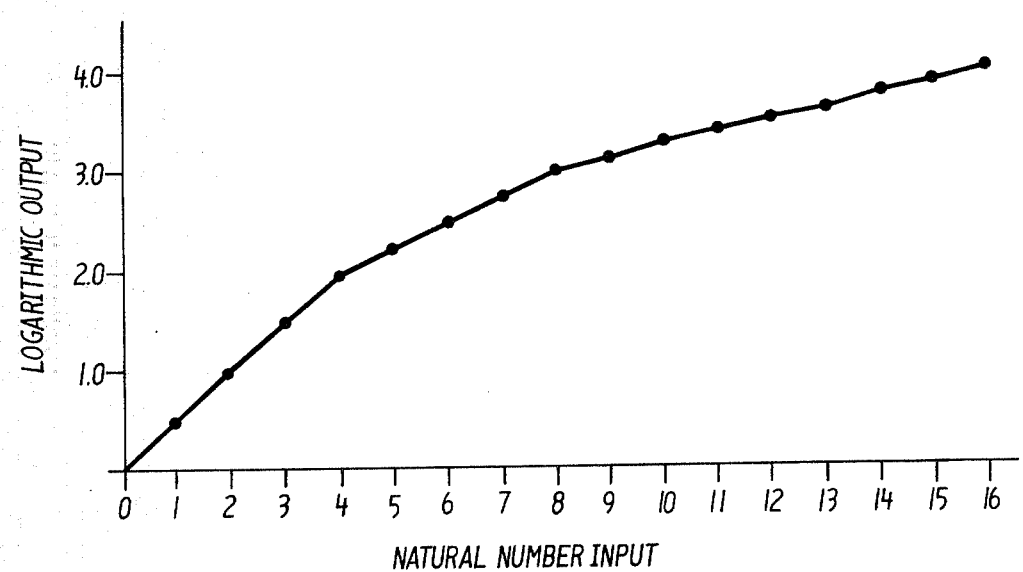
FIG. 5 is a graphical showing of the manner in which the LIN-LOG converter, as shown in FIGS. 2 and 3, operates.

In accordance with the teachings of this invention, the I and Q signals of each channel are applied to a LIN-LOG converter 32 for converting the digital words corresponding to these signals into the digital logarithms corresponding thereto. Many devices including the LIN-LOG converter, as mentioned above, are known in the prior art for converting digital signals into logarithmic representations thereof. The LIN-LOG converter shown in FIG. 2 was chosen for its speed of operation as well as the less-complex hardware involved. The significant characteristic of a LIN-LOG converter is that it provides a linear approximation of the mantissa of the logarithm of the digital number to be converted. For example, with regard to FIG. 5, if the input signal to be converted is 5, the logarithm thereof may be found graphically by tracing the 5 from the X axis to the curve and then finding the corresponding logarithm on the Y axis. In this particular example, the logarithm of 5 has a characteristic of 2 and a mantissa of approximately one-fourth. Though only a linear approximation is achieved by the desired converter, this linear approximation provides sufficient accuracy for this system. Significantly, the digital log converter in the described illustrative embodiment of this invention, is a log converter that converts the digital input signal to a binary logarithm of the base 2. The base 2 has an advantage over the base 10 in that more information is contained in the characteristic, which is relatively easy ot compute. The mantissa then merely serves to interpolate over a small range of values and even a linear approximation will give more than the required accuracy. The conversion to another base is then a matter of multiplication. Further, the characteristic of the binary logarithm to the base 2, is one less than the number of digits to the left of the decimal point. Thus, the characteristic may be easily determined by the LIN-LOG converter 32 which may take the form of known, simple logic gating circuitry. Therefore, the most significant "one" in a given natural, binary number is detected, and the characteristic becomes one less than the position of occurrence of this most significant one in the natural, binary number. The mantissa is approximated by taking the remainder or the next four bits of the number to the right of the most significant bit. In one illustrative example of this invention, the LIN-LOG converter 32 inspects the seven most significant bits for the most significant one and denotes its location by a characteristic between 1 and 7, equal to 1 less than the number of digits to the left of the decimal point. If the converter 32 fails to find any one in the first seven bits, the characteristic is zero. Significantly, after the characteristic has been determined, the mantissa is approximated by taking the remaining or next four bits. As indicated in FIG. 2, the outputs a and b of the converter 32 are respectively a three-bit description of the characteristic (corresponding to a digital number between 0 and 7) and a four-bit approximation of the mantissa. A single polarity bit is derived from one of the analog-to-digital converters to provide an indication of the polarity of the logarithm. Thus, an eight-bit number is formed for storage. Significantly, the remaining digits to the right of the four chosen mantissa bits may be dropped without a significant decrease in the ability to suppress turbulent rain echoes. It is noted that memory 34 has a 32-bit capability for storing the eight-bit signals derived from each of the four analog-to-digital converters 30a, 30b, 30c and 30d. Thus, the memory 34 requires no more storage facility than a normal eight-bit MTI system, but provides 72dB rather than 48dB of dynamic range.

The memory 34 of a digital canceller performs the function performed by the delay lines in an analog delay line canceller; that is, it stores the amplitude of the signal derived from the synchronous detector for the interpulse period. There are many ways of implementing this type of memory, the most common being core memories, thin-film memories, integrated circuit memories and integrated circuit shift registers used as memories. Integrated circuit memories and shift registers are examples of large-scale integration LSI and compete favorably with core memories. A core memory, however, may be preferred because of economic considerations and because of their proven reliability in computer and radar systems. Significantly, the chosen memory 34 has a reduced storage capability, while the overall system is capable of achieving the same rain suppression as high storage digital systems and of providing increased dynamic range.

The canceller processes the latest echo (N) with the preceding echoes (N−1), (N−2), etc. from the same range cell. In the MTI filter shown in FIG. 2, a two-pulse canceller is used and may take the form simply of a digital subtractor 42. As will be explained in greater detail later, the digital subtractor 42 subtracts the digital words which are linear representations of the I or Q components of the echo signal. Thus, the LIN-LOG data stored in memory 34 is converted back to the natural digital word by an antilog converter 40, before successive echo signals are subtracted from each other by the digital subtractor 42. Although the reverse process could function to convert the logarithmic number to a 12-bit natural digital number, it would only contain six bits having any significance; the remaining bits as discussed above, have been discarded before storage. Thus, the apparatus in the remaining portion of the MTI filter processing, requires a capability of handling only a restricted number of bits.

In order to maintain the relative magnitudes of the echo signals to be subtracted from each other, it is necessary to develop a scaling factor whereby the digital numbers may be placed by an antilog converter 40 in the correct digital bit position according to the magnitude of the logarithmic number. More specifically, the characteristics of each of N numbers stored in the memory 34 is applied to a known digital comparator 36 for determining the largest characteristic of the N numbers to be processed by the canceller. In the two-pulse canceller system shown in FIG. 2, the characteristic of the smaller of the two numbers is subtracted from the characteristic of the largest number by a subtract circuit 38 to determine how many bit places or shifts the antilog of the smaller number must be shifted with respect to the digital number of the signal with the largest characteristic. The signal derived from the subtracting circuit 38 is applied to the antilog converter 40, which performs the desired shift, if necessary, of the number with the smaller characteristic. If all characteristics are identical, the numbers generated by the antilog converter 42 are simply SIGN + (1 + MANTISSA). If a characteristic is 1 less than the largest characteristic, the antilog of the smaller number is (SIGN + 0 + 1 + MANTISSA); in other words, its mantissa is shifted one place to the right. In the illustrative embodiment of this invention, the antilog converter 40 maintains the relative magnitudes of the mantissas of the numbers by shifting the smaller mantissas with respect to the largest characteristic. In other words, the relative magnitude of the numbers is indicated by the scaling factor without representing the entire magnitude of the characteristic. Further, the digital subtractor 42 requires only a six-bit capability for subtracting successive echo signals from each other to cancel out clutter signals. In this fashion, the cancellation and subsequent digital log conversion can be accomplished with a minimum number of bits, because the data has been scaled. The scaling or normalizing process may be thought of as scaling the logarithm of each of the N numbers with respect to the largest characteristic of the N numbers.

Because the echoes received by the pair of beams can differ significantly in amplitude and the I and Q components of each echo are also likely to differ significantly, scaling is performed before each of the four sets of echoes is combined or compared, as will be explained later. As shown in FIG. 2, the difference signal derived from the digital subtractor 42 is applied to a digital log converter 44, which reconverts the signal into its logarithmic form. The scaling is achieved by imposing the characteristic of the largest number as derived from the digital comparator 36 onto the mantissa of the characteristics of the N numbers as determined by the digital log converter 44. This is achieved by an adder 46, having one input connected to the digital log converter 44 and another input derived from the digital comparator 36. In other words, the characteristic is imposed by the adder 46 upon the normalized logarithm provided by the converter 44. The data derived from the antilog converter 40 have magnitudes less than two, and the subtractor 42 can do more than double this magnitude. Consequently, the characteristic provided by digital log converter 44 is either zero or one. The adder circuit 46 adds the largest characteristic as determined by the digital comparator 36, to the logarithmic number derived from the digital log converter 44. In effect, the canceled number derived from the subtractor 42 is being multiplied by the scaling factor to restore this number to its relative magnitude.

As shown in FIG. 2, the serial output derived from the adder 46 is applied to a multiplex circuit 51 which functions to apply I and Q components of both the first and second echo signals to a vector combiner 50. In a manner well-known in the art, the vector combiner 50 mixes the two canceled outputs for each receiver channel into a composite signal having a magnitude independent of phase. The recombined signal for each corresponding echo signal is applied to a digital subtractor 52. Since the applied signal is still in logarithmic form, the digital subtractor circuit 52 subtracts the logarithmic number of one channel from the other of the two channels to provide an output signal. It may be understood that this output signal is indicative of the ratio of the amplitudes of the left and right echo signals and that the digital subtractor 52 functions to divide the echo signal of one channel into the echo signal of the other to provide a ratio signal therebetween. The signal derived from the digital subtractor 52 is applied to a digital analog converter 54 whose output signal may be applied to control the vernier deflection of a cathode ray tube. The signals derived from the digital-to-analog converter 54 provide an accurate indication of the angle between the detected target and the boresight of the radar antenna 10. Further, the larger of the combined signals may be applied from the combiner circuit 50 to a digital-to-analog converter circuit 56. The output from the digital-to-analog converter 56 may, in turn, intensify the CRT display to provide an indication of the range of aircraft or heavy rain echoes.

Thus, there has been described a system capable of eight-bit storage of echo data to provide 72 dB of dynamic range (12 bits) with a data precision compatible with a 30 dB MTI improvement (five to six bits of data on each echo). The LIN-LOG processing of data has achieved a desirable trade-off of bits or precision to gain additional bits of dynamic range.

Figure 3:
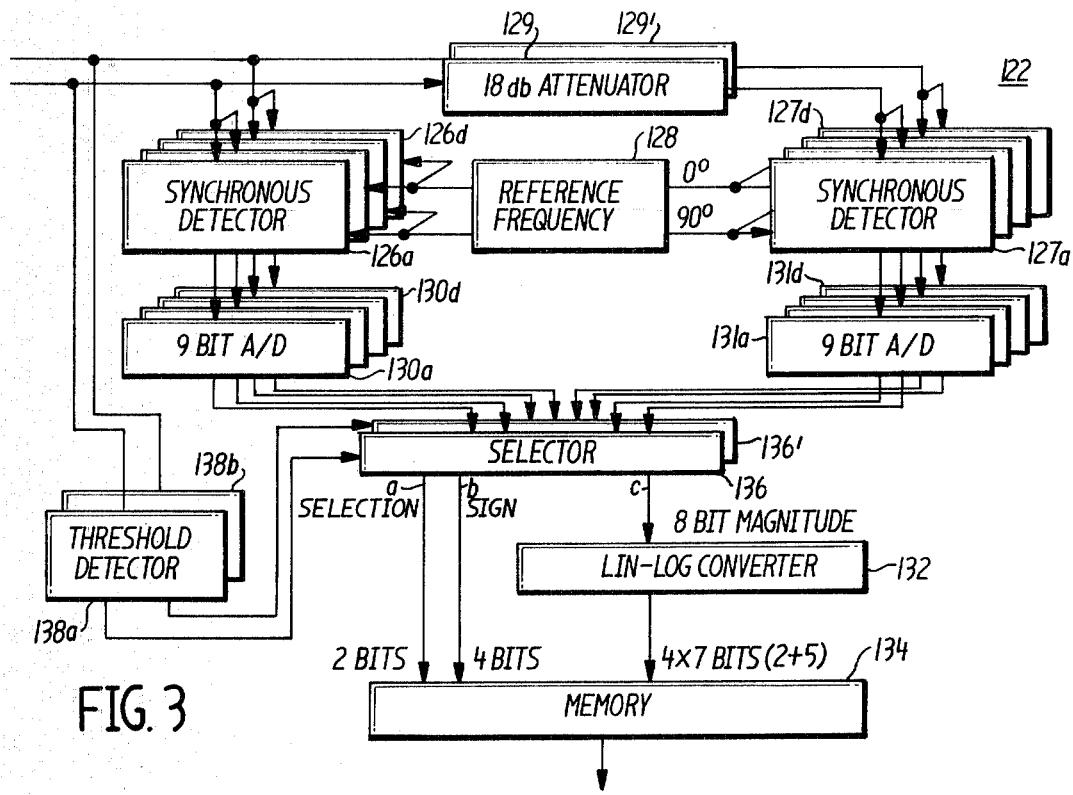
FIG. 3 is an alternative embodiment of the filtering circuit in accordance with teachings of this invention.

In the MTI filter circuit 22 of FIG. 2, teh analog portions of the radar receiver, the synchronous detectors and the analog-to-digital converters required a dynamic range in the order of that desired by the overall system. Synchronous detectors having a noise and hum compatible with dynamic range and capable of maintaining a known "zero" to the degree of accuracy required, are complex and expensive. Further, the use of a twelve-bit analog-to-digital converter requires an expensive as well as a complicated piece of equipment. In the alternative embodiment of this invention as shown in FIG. 3, a pair of nine-bit analog-to-digital converters 130 and 131 are cascade connected to provide a performance at least equal to that of the circuit of FIG. 2. Although there are twice as many synchronous detectors and analog-to-digital converters, these pieces of equipment are typically less expensive and less complex than similar apparatus having a 12-bit capability.

It is important that all N echo signals being processed by the canceller will originate from the same channel, because it is possible to obtain identical data from two separate channels to the degree of accuracy needed for an MTI system. Consequently, the cascaded receiver approach is most applicable to phased array radars, which transmit a burst of M pulses in the same direction to obtain $(M - N + 1)$ valid outputs from MTI. The first echo pulse of each burst defines the magnitude of the echo and the receiver can decide which channel to employ for each individual range cell for all M pulses in the burst.

As shown in FIG. 3, the left and right echo signals transmitted respectively along the two channels of the radar receiver, are applied respectively to a first pair of synchronous detectors 126a and 126b and to a second set of synchronous detectors 126c and 126d. In parallel, the left and right echo signals are attenuated by suitable 18 dB attenuators 129 and 129', respectively; the attenuated signals of each attenuator are applied in turn to a third set of synchronous detectors 127a and 127b and a fourth set of synchronous detectors 127c and 127d. A reference frequency source 128 provides two sets of reference frequency signals to be applied to the synchronous detectors to homodyne the input echo signals to provide their I and Q components. The I and Q components derived from the synchronous detectors 126 are applied, in turn, to a first set of nine-bit analog-to-digital converters 130a, 130b, 130c and 130d. In a similar fashion, the I and Q components derived from the synchronous detectors 127a, 127b, 127c and 127d are applied to a second set of nine-bit analog-to-digital converters 131a, 131b, 131c, and 131d, respectively. As is evident from FIG. 3, the echo signals applied to the synchronous detectors 127 are attenuated 18 dB with respect to those signals applied to the synchronous detectors 126. A pair of threshold detectors 138a and 138b are connected respectively to receive the first and second echo signals of each channel and to provide an output indicative of whether the echo signals are above or below a predetermined magnitude.

It is an object of the embodiments shown in FIG. 3 to provide from both sets of the nine-bit analog-to-digital converters 130 and 131 the equivalent of a digital signal of 12 bits for the I and Q signals of each channel. The nine-bit signals derived from one of the analog-to-digital converters 130 overlap six bits with the nine-bit signal derived from the analog-to-digital converter 131. As shown in FIG. 3, the output signals derived from the sets of analog-to-digital converters 130 and 131 are applied to selector circuits 136 and 136', one for each channel of the receiver. The output signals derived from the threshold detectors 138a and 138b control the selection of bits to be subsequently processed. For example, if a relatively high amplitude signal is detected, the selector will choose the nine bits derived from the set of analog-to-digital converters 131. In a reverse fashion, if the threshold detectors 138a and b determine that the input signal is below a predetermined level, the selector circuits 136 and 136' will utilize the nine bits of the signal derived from the set of analog-to-digital converters 130. In this manner, two cascaded nine-bit analog-to-digital converters are used to achieve the desired 12-bit analog-to-digital conversion process with at least six significant bits at the transition point.

In a manner similar to that described above, the selector applies a digital word of eight bits selectively determined from both sets of the analog-to-digital converters 130 and 131 to a LIN-LOG converter 132 to provide the logarithm of the input signal. Illustratively, the LIN-LOG converter 132 provides an output whose first two digits indicate the characteristic and the remaining five bits indicate the mantissa. Further, the selector circuits provide two more bit positions to indicate which set of the analog-to-digital converters the signal bits were derived from, and four bits to indicate the sign of the respective I and Q components of each channel. These signals are stored in a single memory 134, which requires illustratively a 34-bit capability.

Figure 4:
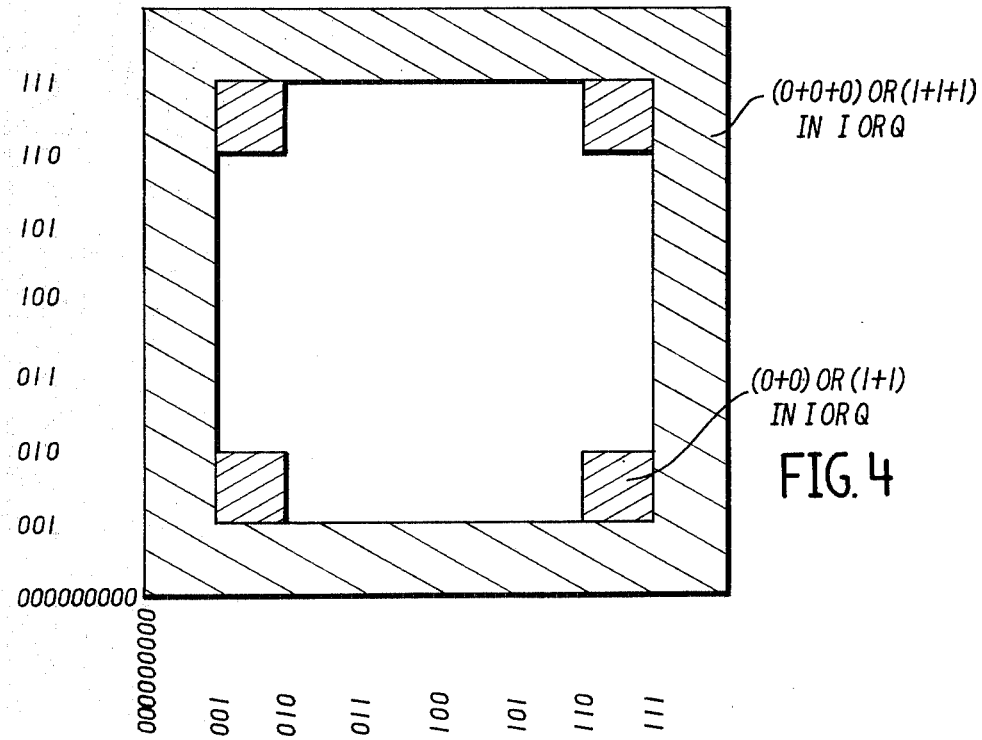
FIG. 4 shows a graph indicating the I and Q signals in digital word form and the manner of selection of the attenuated channel if the I and Q signals fall in the shaded area of FIG. IV.

In an alternative embodiment, the magnitude of the echo signals of each channel may be determined by logical interpretation of the digital data from the I and Q detectors of either channel, as opposed to the threshold detectors of FIG. 3. One example of this logical decision process is shown in FIG. 4, based on the examination of the three most significant bits derived from the outputs of the unattenuated channel of the nine-bit analog-to-digital converter. This technique has the advantage that the devices which can saturate are producing the decision and that their adjustment is less critical.

With regard to FIG. 4, the shaded area represents a degree of uncertainty as to the strength of the echo which is causing a switch-over to the attenuated channel. Consequently, the data in the attenuated channel may be as much as one bit less accurate than the degree of overlap would indicate. For example, a six-bit overlap is needed to guarantee a five-bit accuracy for the weakest echo which can cause switch-over.

Thus, there has been shown a method and apparatus for achieving cancellation of echo signals derived from clutter signals and providing signals indicative of a moving target requiring apparatus including storage devices capable of handling a limited number of bits while maintaining a high dynamic range. This achievement is performed while maintaining the overall accuracy of the system. As a result, the magnitude of the echo signals is maintained and the ratio thereof may be obtained to provide an indication of the angle between the antenna boresight and the target.

Numerous changes may be made in the above-described apparatus and the different embodiments of the invention may be made without departing from the spirit thereof; therefore, it is intended that all matter contained in the foregoing description and in the accompanying drawings whall be interpreted as illustrative and not in a limiting sense.

What is claimed is:

1. In a moving target indicator radar system, a canceling circuit for suppressing echo signals from relatively slow-moving and/or stationary objects, said system comprising:
 a. analog-to-digital conversion means for converting a series of detected analog echo signals into corresponding natural digital words of $n$ bits;
 b. logarithmic converting means for converting the series of natural digital words into logarithmic digital words having X bits indicative of its characteristic and Y bits indicative of its mantissa, where $X + Y < n$;
 c. storage means for storing a plurality of successive logarithmic digital words, said storage means having a storage capability of a number of bits;
 d. antilog converting means for converting the stored logarithmic digital words into natural digital words; and
 e. canceller means for combining the plurality of successive natural digital words derived from said storage means to suppress substantially those successive digital words of substantially equal amplitude corresponding to detected echo signals derived from the relatively slow-moving and/or stationary objects.

2. A canceling circuit as claimed in claim 1, wherein said logarithmic converting means converts the series of natural digital words into logarithmic binary words of a base 2.

3. A canceling circuit as claimed in claim 1, wherein there is included scaling means for comparing the logarithmic digital words for determining the orders of magnitudes of the characteristics of the logarithmic digital words and for adjusting the positions of the mantissa bits of each of the smaller logarithmic digital words in accordance with their relative characteristics, to provide a normalized logarithmic word.

4. A canceling circuit as claimed in claim 3, wherein said scaling means includes digital comparator means for determining which of the logarithmic digital words has the largest characteristic, and subtraction means for determining the difference between a smaller characteristic and the largest characteristic as derived from said digital comparator means.

5. A canceling circuit as claimed in claim 4, wherein said antilog menas is responsive to the difference determined by said subtraction means for shifting the bits of the mantissas of the smaller logarithmic digital words in accordance with the difference in the characteristics to provide an indication of the relative magnitudes of the smaller logarithmic binary words with respect to the largest logarithmic binary word.

6. A canceling circuit as claimed in claim 4, wherein said digital comparator means provides a scaling factor indicative of the largest charactistic, and adder means responsive to the scaling factor and the bits indicative of the normalized logarithmic digital word for providing a logarithmic digital word whose absolute magnitude has been restored.

7. A canceling circuit as claimed in claim 2, wherein there is included scaling means for comparing the logarithmic binary words for determining the order of magnitudes of the characteristics of the logarithmic binary words and for adjusting the positions of the mantissa bits of each of the logarithmic binary words in accordance with their relative characteristics.

8. A canceling circuit as claimed in claim 2, wherein said logarithmic converting means inspects the T most significant bits of a natural binary word and provides its characteristic dependent upon the location of the most significant "one" of the T bits, said logarithmic converting means providing a mantissa of the logarithmic binary word from the next Y bits of the natural binary number from the most significant one thereof.

9. A canceling circuit as claimed in claim 1, wherein there is included second logarithmic converting means for converting the natural digital words derived from said canceller means into a logarithmic digital word normalized with respect to the largest characteristic, adder means, and means for deriving a scaling factor in accordance with the largest characteristic of the plurality of successive logarithmic digital words and applying the scaling factor to said adder means whereby the largest characteristic is added to the normalized logarithmic digital word to provide a corrected logarithmic word of absolute magnitude.

10. A moving target indicator radar system comprising:
 a. radar antenna means for receiving at least first and second radar beams and for providing at least first and second echo signals corresponding to the first and second radar beams, respectively;
 b. first and second channels for processing, respectively, the first and second echo signals, said channels being associated with at least one canceling circuit for suppressing echo signals from relatively slow-moving and/or stationary objects, said canceling circuit comprising:
  1. analog-to-digital conversion means for converting a series of detected analog echo signals directed along one of said channels into corresponding natural digital words of n bits;
  2. logarithmic converting means for converting the series of natural digital words into logarithmic digital words having X bits indicative of its characteristic and Y bits indicative of its mantissa, where $X + Y < n$;
  3. storage means for storing the logarithmic digital words, said storage means having a storage capability of a number of bits not greater than $n$;
  4. antilog converting means for converting the stored logarithimic digital words into natural digital words;
  5. canceller means for combining a number of successive natural digital words derived from said antilog converting means to suppress substantially those successive digital words of substantially equal amplitude corresponding to echo signals derived from the relatively slow-moving and/or stationary objects and to provide an output signal indicative of echo signals corresponding to relatively fast-moving objects;
  6. second logarithmic means for converting the natural digital words derived from said canceller means into logarithmic digital words normalized with respect to the largest characteristic;
  7. adder means; and
  8. scaling means for deriving a scaling factor in accordance with the largest characteristic of the series of logarithmic digital words and for applying the scaling factor to said adder means whereby the largest characteristic is added to the normalized logarithmic digital word to provide a corrected logarithmic word of absolute magnitude; and c. subtraction means for subtracting the corrected logarithmic digital word derived from said first channel from the corrected logarithmic digital word derived from said second channel, to provide a signal indicative of the angle of the target from the boresight of said radar antenna means.

11. A moving target indicator radar system as claimed in claim 10, wherein each canceller circuit includes first and second synchronous detectors and a reference frequency source for generating a first reference frequency signal and a second reference frequency signal shifted 90° to phase from the first reference signal, to be applied respectively to said first and second synchronous detectors and combined therein with the echo signal of that channel to provide in-phase (I) and quadrature (Q) signals, said analog-to-digital conversion means responsive to each of the I and Q signals to provide distinct natural digital words therefor, said storage means having the capability of storing the I and Q logarithmic digital words for each channel, and first and second vector combining means for respectively combining the I and Q signals of the first and second channels to provide a combined signal corresponding to the amplitude of the detected echo signals for the first and second channels.

12. A moving target indicator radar system as claimed in claim 11, wherein said analog-to-digital conversion means comprises first and second conversion means, each having a capability of converting analog echo signals into corresponding natural digital words of $Z$ bits less than $n$.

13. A moving target indicator radar system as claimed in claim 12, wherein the detected echo signal is applied to said first conversion means, attenuation means for attenuating and applying said echo signal to said second conversion means, amplitude detecting means for detecting the magnitude of the detected echo signals and for determining whether the detected echo signal is above or below the predetermined level, and selector means responsive to said threshold detection means when a detected echo signal is below the predetermined level for deriving a first digital output from said first conversion means and responsive to said threshold detector means when the detected echo signal is above the predetermined level for deriving a second digital output from said second conversion means.

14. A moving target indicator radar system as claimed in claim 13, wherein the range of conversion of said first and second conversion means overlap with each other.

15. A moving target indicator radar system as claimed in claim 11, wherein there is further included commutation means for applying sequentially the I and Q signals of each channel to be processed by a single canceling circuit.

* * * * *